United States Patent Office 3,285,983
Patented Nov. 15, 1966

3,285,983
PROCESS FOR THE HYDROGENATION OF TRANS, CIS-1,5-CYCLODECADIENE TO CIS-CYCLODECENE
Joseph T. Arrigo, Mount Prospect, Ill., assignor to Universal Oil Products Company, Des Plaines, Ill., a corporation of Delaware
No Drawing. Filed Feb. 4, 1965, Ser. No. 430,499
4 Claims. (Cl. 260—666)

This invention relates to the preparation of cis-cyclodecene, a useful intermediate in the production of sebacic acid. It is an object of this invention to present a novel process for the selective hydrogenation of trans,cis-1,5-cyclodecadiene to form the desired cis-cyclodecene.

The trans,cis-1,5-cyclodecadiene, selectively hydrogenated to form cis-cyclodecene in accordance with the process of this invention, is known in the art, being prepared, for example, by the cyclocooligomerization of two moles of butadiene with one mole of ethylene in the presence of a catalyst described as a π-allyl nickel complex. A description of the trans,cis-1,5-cyclodecadiene, as well as its preparation, is found in Angewandte Chemie, Internation Edition, vol. 2, No. 3, page 105, March 1963, and vol. 3, No. 10, page 702, October 1964. The trans,-cis-1,5-cyclodecadiene can be converted to cis-cyclodecene by conventional hydrogenation techniques although selectivity is markedly less than desired and inadequate for industrial use. The process of this invention enables one to achieve a selectivity in excess of 89% at 100% conversion. Optimum conversion is desirable since it is extremely difficult to separate the unconverted cyclodecadiene by conventional means for recycle in a continuous process or for recovery in a batch process. It has been discovered that the selective hydrogenation of trans,cis-1,5-cyclodecadiene is drastically impaired by the formation of a cyclodecadiene isomer, tentatively identified as cis,cis-1,6-cyclodecadiene. This isomer, melting at 26.5–28° C., has been isolated and found to be extremely difficult to hydrogenate with any appreciable degree of selectivity, the fully saturated cyclodecane comprising a substantial portion of hydrogenation product. By the process of this invention, the undesired formation of this isomeric cyclodecadiene is minimized and trans,cis-1,5-cyclodecadiene is converted to cis-cyclodecene in excess of about 89% at 100% conversion.

In one of its broad aspects, the present invention embodies a process for the preparation of cis-cyclodecene which comprises reacting hydrogen and trans,cis-1,5-cyclodecadiene in contact with a catalytic composite comprising platinum and alumina at a temperature of from about 0° C. to about 100° C. and at a hydrogen pressure of from about 200 p.s.i.g. to about 1000 p.s.i.g.

The selective hydrogenation of trans,cis-1,5-cyclodecadiene as herein contemplated is effected in contact with a catalytic composite comprising platinum and alumina. The alumina is preferably synthetic alumina although naturally occurring alumina such as is recovered from bauxite may also be utilized. The description "alumina" is intended to include porous alumina in its various states of hydration and generally referred to as activated alumina. Synthetically prepared alumina may be of the gel type generally prepared by precipitation methods. For example, an alkaline reagent such as ammonium hydroxide is commingled with an aqueous solution of aluminum chloride, or other suitable acidic solution of an aluminum salt, to precipitate the desired alumina. An alternative method comprises commingling hydrochloric acid, sulfuric acid or the like, with an alkaline solution of an aluminum salt, for example, sodium aluminate, and precipitating alumina.

The alumina may be utilized in the form of spheres, pills, extrudate, granules, briquettes, or the like. A preferred form is the low density sphere prepared, for example, by the well-known oil-drop method wherein a sol, prepared by digesting alumina in sulfuric acid at a controlled pH is discharged, by means of a nozzle or rotating disk, into an oil bath, forming firm gel particles during passage therethrough. The spheres may be recovered by means of a stream of water disposed beneath the oil layer. This method is fully described in U.S. Patent 2,620,314, issued to James Hoekstra. In any case, the alumina is activated by one or more treatments including drying, calcining, steaming, or treatment with various chemical reagents to develop a highly porous material.

The catalytic composite of this invention may comprise from about 0.1 to about 5.0 wt. percent platinum. Although a higher concentration of platinum is operable, no particular benefit is derived therefrom, particularly in view of the cost of the catalyst involved. A platinum content of from about 0.3 to about 3.0 wt. percent is preferred. The quantity of platinum is based on the weight of the final catalyst composite and calculated on the basis of elemental metal notwithstanding that the platinum may exist in some complex combination with the alumina or in the elemental state.

Although the alumina may serve incidentally as a support for the platinum, its primary value lies in its contribution to the selectivity of the catalytic composite with respect to the conversion of trans,cis-1,5-cyclodecadiene to cis-cyclodecene. The platinum is composited with the alumina by any suitable method. For example, the alumina can be soaked, dipped, suspended or otherwise immersed in a solution of a suitable platinum compound including platinum chloride, chloro-platinic acid, and the like. Although the precise manner in which the platinum component combines with the alumina component is not known with certainty, it is contemplated that the platinum and alumina enter into a complex combination. It is therefore understood that the description "platinum" connotes platinum existing in its elemental state and/or in a combined form with the alumina, often reported as platinum oxide.

The catalytic composite is dried and calcined prior to use. Calcination is suitably effected at a temperature of at least about 425° C., generally at a temperature in the range of from about 425° C. to about 815° C., and preferably in a reducing atmosphere such as hydrogen.

Selective hydrogenation of the trans, cis-1,5-cyclodecadiene is effected within a period of from about 1 to about 48 hours at a temperature of from about 0° C. to about 100° C., the rate of hydrogenation decreasing with temperature. Selectivity drops off somewhat with increasing temperature but is substantially unaffected within the preferred temperature range of from about 0° C. to about 25° C. While it would appear that a hydrogen concentration in excess of stoichiometric amount would be detrimental in the selective hydrogenation of one of two double bonds as herein contemplated, an excess is in fact essential. The hydrogen concentration, expressed in terms of hydrogen pressure, should be from about 200 p.s.i.g. to about 1000 p.s.i.g.

The process of this invention can be effected batchwise or in a continuous flow type of operation. For example, a high pressure reaction vessel such as an autoclave designed for the introduction of hydrogen and equipped with temperature control means can be employed. The catalyst is placed in the autoclave together with the cyclodecadiene charge. It is preferable to include an inert solvent in a substantial amount to aid in the dissipation of the heat of reaction. Cyclohexane is a suitable solvent as is benzene or other aromtaic hydrocarbon, aromatic hydrocarbons being substantially inert to hydrogenation at reaction conditions herein employed. The autoclave is flushed one or more times with dry nitrogen and then pressured to the desired initial pressure with hydrogen. Since hydrogen is consumed in the reaction, progress of the reaction can be ascertained with reference to pressure although it may be desired to maintain a constant pressure by the continuous or intermittent addition of hydrogen to the reaction vessel. On completion of an adequate residence time at reaction conditions, the autoclave is vented and the liquid contents decanted from the catalyst. The reaction product at 100% trans,cis-1,5-cyclodecadiene conversion is stable at distillation conditions even at atmospheric pressure and is readily distilled under a nitrogen blanket to yield the desired cis-cyclodecene product.

The cyclodecadiene can be selectively hydrogenated to cyclodecene in a continuous manner on a once-through basis. For example, the cyclodecadiene together with a substantially inert solvent, such as cyclohexane, is charged to a high pressure reaction chamber equipped with temperature control means and containing the catalyst disposed in a fixed bed therein. The reaction chamber is maintained at the desired pressure by means of hydrogen charged thereto either in a separate stream or commingled with the cyclodecadiene charge. The reactor effluent is recovered in a high pressure separator adequately cooled to insure separation of liquid and gaseous phases. The gaseous phase comprising hydrogen is recycled to the reaction chamber while the liquid phase is metered through a pressure reducing valve and passed to a distillation column for the separation of solvent and by-products and recovery of ciscyclodecene.

The following examples are presented in illustration of the process of this invention and are not intended as an undue limitation on the generally broad scope of the invention as set out in the appended claims. Various catalysts were prepared and identified as follows.

Catalyst A: Prepared by impregnating calcined alumina microspheres having an average bulk density (ABD) of 0.28 gm./cc. with a solution of chloroplatinic acid so as to form a final catalyst composite comprising 1.5% platinum. The impregnated spheres were dried and calcined in air at 510° C. for 6 hours and then reduced in hydrogen for 1.5 hours at 510° C.

Catalyst B: Prepared by impregnating calcined alumina microspheres having an ABD of .45 gm./cc. with a solution of chloroplatinic acid so as to form a final catalyst composite comprising 0.75% platinum. The impregnated spheres were dried and calcined in air at 510° C. for 6 hours and then reduced in hydrogen for 1.5 hours at 510° C.

Catalyst C: Prepared by impregnating calcined alumina microspheres having an ABD of .45 gm./cc. with a solution of palladium chloride so as to form a final catalyst composite comprising 0.75% palladium. The impregnated spheres were dried and calcined in a stream of air and 20% steam for 5 hours at 510° C. and then reduced in hydrogen for 1.5 hours at 510° C.

Catalyst D: Prepared by impregnating calcined alumina microspheres having an ABD of .45 gm./cc. with a solution of ruthenium chloride so as to form a final catalyst composite comprising 0.75% ruthenium. The impregnated spheres were dried and calcined in a stream of air and 20% steam for 5 hours at 510° C. and then reduced in hydrogen for 1.5 hours at 510° C.

Catalyst E: Prepared by impregnating calcined alumina microspheres having an ABD of .45 gm./cc. with a solution of rhodium chloride so as to form a final catalyst composite comprising 0.75% rhodium. The impregnated spheres were dried and calcined in a stream of air and 20% steam for 5 hours at 510° C. and then reduced in hydrogen for 1.5 hours at 510° C.

Catalyst F: Prepared by impregnating activated carbon obtained from Pittsburgh Chemical Company, type BPL, with a solution of chloroplatinic acid to form a final catalyst composite comprising 0.65% platinum. The catalyst was dried and reduced in hydrogen for 2 hours.

Catalyst G: Prepared by impregnating silica gel with a solution of chloroplatinic acid, drying and calcining the same in air for 5 hours at 510° C. The catalyst composite was then reduced in hydrogen for 1.5 hours at 510° C. The final catalyst composite contained 0.75% platinum.

The following data was obtained by passing a continuous flow of hydrogen and a charge stock comprising 20 wt. percent trans, cis-1,5-cyclodecadiene and 80 wt. percent cyclohexane in contact with each of the described catalysts located in a 3/16 inch I.D. stainless steel tubular reactor. In view of the limited dimensions of the reactor, the catalyst was ground to give a 40–60 mesh material. The reactor was maintained in a glycol-water bath to permit operation in the desired temperature range. After the bath was brought to the desired operating temperature the reactor, previously charged with catalyst, was installed. Hydrogen pressure and flow rate was established at 750 p.s.i.g. and 2.5 s.c.f./hr. Thereafter, the trans,cis-1,5-cyclodecadiene was processed over the catalyst for a period of about 2 hours. The reactor effluent was collected in a high pressure receiver to facilitate recovery. In these tests hydrogen was discharged rather than recycled. The liquid product was analyzed by gas-liquid chromatography methods.

| Run No. | 1 | 2 | 3 | 4 | 5 | 6 | 7 | 8 |
|---|---|---|---|---|---|---|---|---|
| Catalyst | A | A | B | C | D | E | F | G |
| Wt. gms. | 1.7 | .3 | 2.4 | 2.8 | 2.8 | .6 | 2.8 | 4.7 |
| Vol., cc. | 6.7 | 1.5 | 6.6 | 6.6 | 6.6 | 1.5 | 6.3 | 6.1 |
| Charge: | | | | | | | | |
|   CDD,ª LHSV ᶜ | 0.85 | 2.2 | 0.9 | 2.8 | 2.2 | 7.1 | 1.3 | 0.5 |
|   H₂, s.c.f./hr. | 2.5 | 2.5 | 2.5 | 2.5 | 2.5 | 2.5 | 2.5 | 2.5 |
| Reaction Conditions: | | | | | | | | |
|   Temp., °C | 5 | 25 | 5 | 5 | 5 | 5 | 5 | 5 |
|   Press., p.s.i.g. | 750 | 750 | 750 | 750 | 750 | 750 | 750 | 750 |
| Conversion, percent | 98 | 99 | 99 | 98 | 90 | 98 | 98 | 91 |
| Percent Selectivity to— | | | | | | | | |
|   c-Cyclodecene | 91 | 86 | 90 | 62 | 27 | 71 | 66 | 65 |
|   Cyclodecane | 5 | 10 | 5 | 16 | 58 | 9 | 24 | 25 |
|   CDX ᵇ | 4 | 3 | 3 | 20 | 3 | 18 | 8 | 2 |

ª trans, cis-1,5-cyclodecadiene.
ᵇ Isomeric cyclodecadiene.
ᶜ Liquid Hourly Space Velocity.

The tabulated data clearly illustrate the unique character of the platinum-alumina catalyst composite with respect to the selective hydrogenation of trans,cis-1,5-cyclodecadiene. The platinum-alumina catalyst composite of Runs 1, 2, and 3 show a selectivity of 86–91% at a 98–99% conversion level. Lowering the temperature from 25° C. to 5° C. has a small but beneficial effect on selectivity as will be observed by a comparison of Runs 1 and 2. That platinum is unique among the platinum metals is shown in Runs 4 through 6. Palladium composited with alumina (Catalyst C) causes excessive isomerization of the trans,cis-1,5-cyclodecadiene to the isomeric cyclodecadiene which is extremely difficult to hydrogenate selectively to the desired cyclodecene. Ruthenium composited with alumina (Catalyst D) shows extremely poor selectivity, 27% at 90% conversion. Rhodium composited with alumina (Catalyst E) gives excessive isomerization, as in the case of palladium composited with alumina, converting 18% of the trans,cis-1,5-cyclodecadiene to the isomeric cyclodecadiene. That alumina contributes to the selectivity of the platinum-alumina composite is illustrated by Runs 7 and 8 in which activated carbon and silica gel were substituted for the alumina. Activated carbon and silica gel composited with platinum showed selectivities of only 66% and 65% respectively at conversion levels of 98% and 91%.

I claim as my invention:

1. A process for the preparation of cis-cyclodecene which comprises reacting hydrogen and trans,cis-1,5-cyclodecadiene in contact with a catalytic composite comprising platinum and alumina at a temperature of from about 0° C. to about 100° C. and at a hydrogen pressure of from about 200 p.s.i.g. to about 1000 p.s.i.g.

2. A process for the preparation of cis-cyclodecene which comprises reacting hydrogen and trans,cis-1,5-cyclodecadiene in contact with a catalytic composite comprising platinum and alumina at a temperature of from about 0° C. to about 25° C. and at a hydrogen pressure of from about 200 p.s.i.g. to about 1000 p.s.i.g.

3. A process for the preparation of cis-cyclodecene which comprises reacting hydrogen and trans,cis-1,5-cyclodecadiene in contact with a catalytic composite comprising from about 0.1 to about 5.0 weight percent platinum composited with alumina at a temperature of from about 0° C. to about 25° C. and at a hydrogen pressure of from about 200 p.s.i.g. to about 1000 p.s.i.g.

4. A process for the preparation of cis-cyclodecene which comprises reacting hydrogen and trans,cis-1,5-cyclodecadiene in contact with a catalytic composite comprising from about 0.3 to about 3.0 weight percent platinum composited with alumina at a temperature of from about 0° C. to about 25° C. and at a hydrogen pressure of from about 200 p.s.i.g. to about 1000 p.s.i.g.

References Cited by the Examiner

William R. Moore: J. Amer. Chem. Soc., vol. 84, pp. 3788–3789, October 5, 1962.

DELBERT E. GANTZ, *Primary Examiner.*

V. O'KEEFE, *Assistant Examiner.*